R. HUFF.
MOTOR VEHICLE.
APPLICATION FILED JUNE 27, 1908.
1,002,848.
Patented Sept. 12, 1911.
3 SHEETS—SHEET 3.
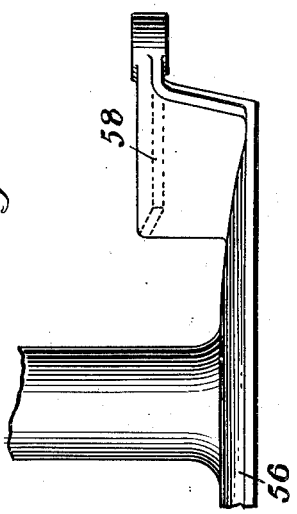
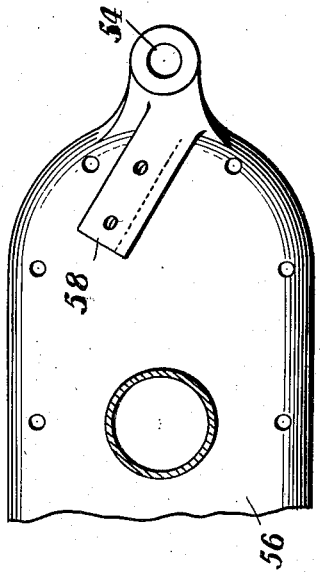
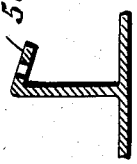
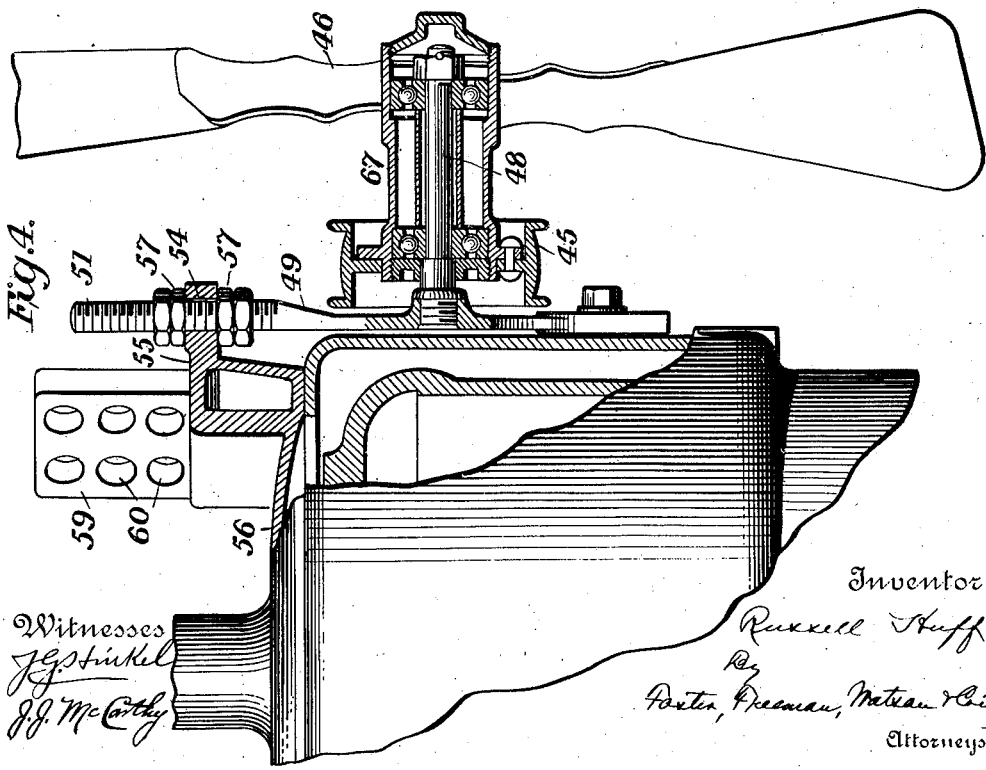
Witnesses
Inventor
Russell Huff

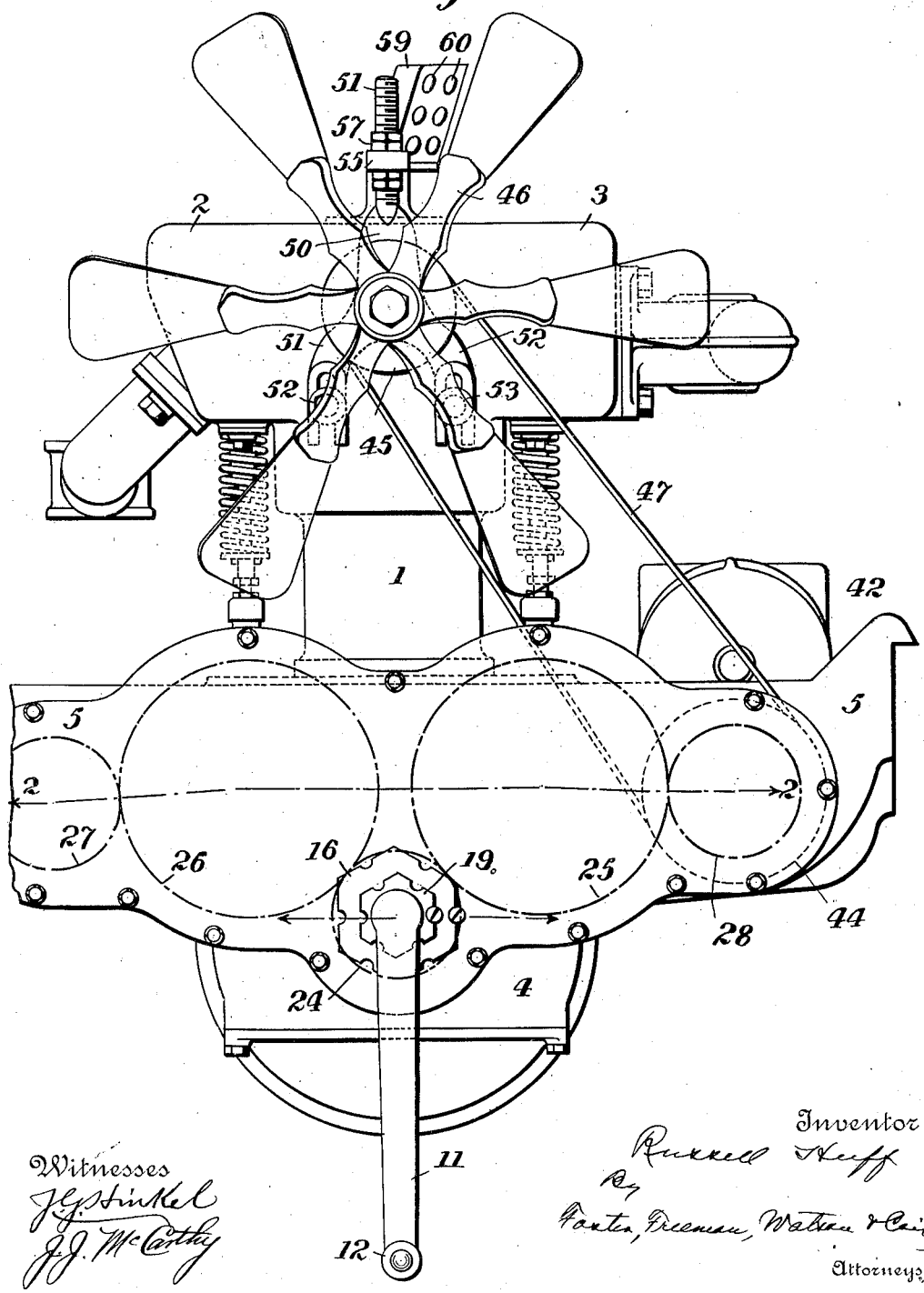

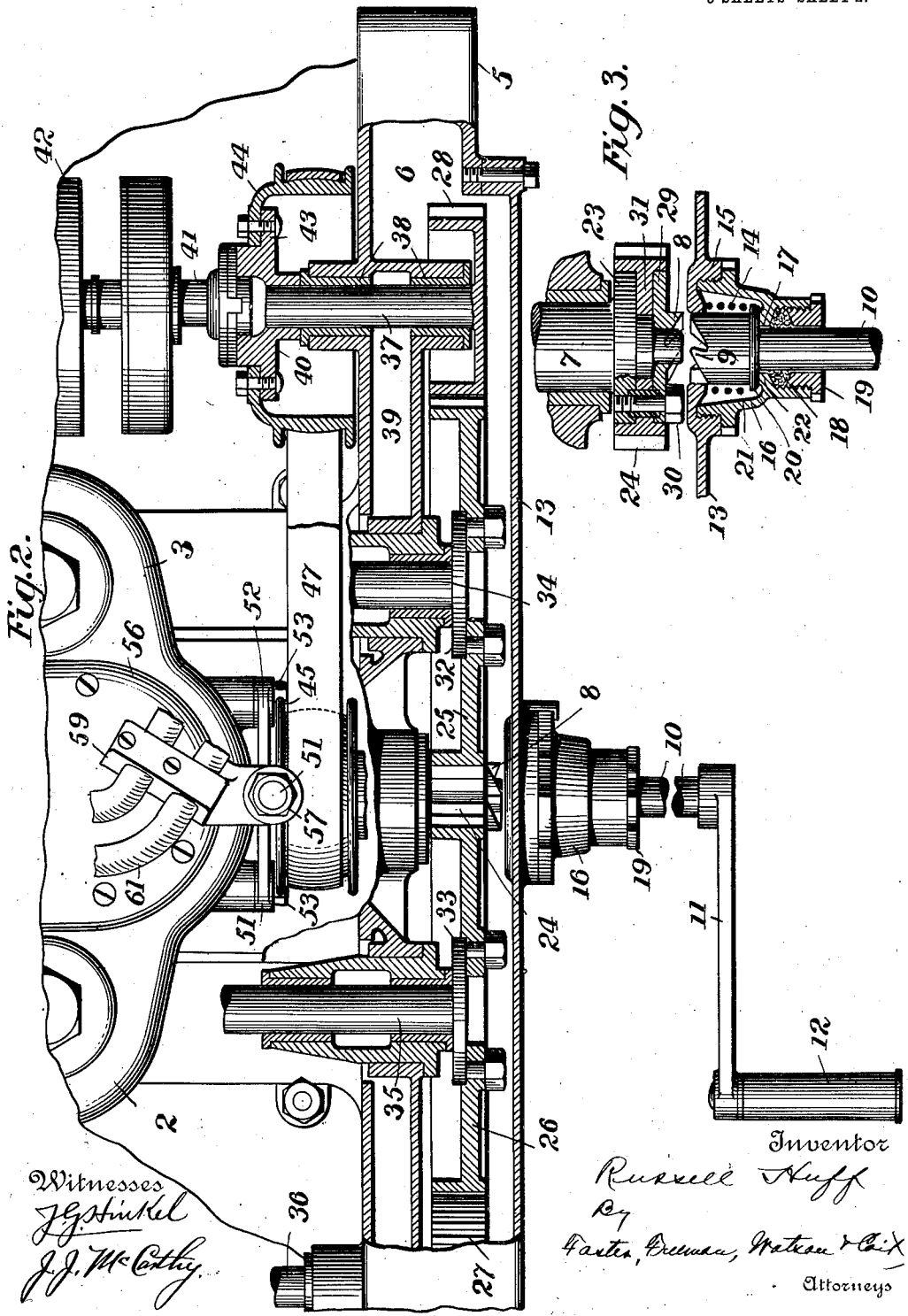

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,002,848.  Specification of Letters Patent.  Patented Sept. 12, 1911.

Application filed June 27, 1908. Serial No. 440,699.

*To all whom it may concern:*

Be it known that I, RUSSELL HUFF, a citizen of the United States, and residing at Detroit, in the county of Wayne and State of Michigan, have invented certain new and useful Improvements in Motor-Vehicles, of which the following is a specification.

This invention relates to motor vehicles and particularly to the gear casing arranged at one end of the hydrocarbon engine used in such vehicles. It has special reference to the arrangement of starting shaft and to the arrangement and means for operating the adjustable fan which is ordinarily used to circulate air through the radiator for the purpose of cooling.

It has been customary heretofore, in most cases in which hydrocarbon engines are employed in motor vehicles and in which the radiator is arranged immediately in front of the engine and where a fan driven by the engine is used to increase the circulation of air through the radiator, to extend the engine crank shaft through a suitable packed opening in the front end of the crank case and attach thereto a pulley which is connected by a belt with the fan pulley for the purpose of driving the fan. Also heretofore the projecting front end of the crank shaft has been provided with clutch teeth which are adapted to mesh with a longitudinally movable starting crank shaft to provide a rigid connection between the starting crank shaft and the crank shaft proper for the purpose of manually starting the engine. In engines having a gear case transversely arranged at the end of the crank case, it was necessary to extend the crank shaft entirely through said gear case and through the forward wall of said case. As is well known in engines of this character considerable oil is always maintained in both the crank case and the gear case, and it was found difficult to keep the joint tight around the forward end of the crank shaft, and owing to its low position in the gear case the oil leaked out readily and being picked up by the rapidly rotating fan pulley, was thrown by centrifugal force in all directions. The present invention is intended to overcome this defect and to secure other advantages hereafter described. To this end I arrange the end of the crank shaft wholly within the front gear case and extend the starting crank shaft through a packed bearing in the front wall of the gear case to a position in proximity to the end of the crank shaft. As the starting crank shaft rotates only when it is being manipulated for the purpose of starting the engine, it is an easy matter to secure and maintain a tight joint around this shaft. Since by this arrangement there is no projecting end of the crank shaft from which to drive the fan I use one of the auxiliary shafts for this purpose, and in the present instance I connect the fan to the magneto shaft. In order to secure relative adjustment between the driving and driven shafts for operating the fan I have devised a very simple adjustable fan bracket, and have devised improved means for mounting it.

Other features of my invention and their advantages will be apparent from the following description.

In the accompanying drawings: Figure 1 is a front elevation of the engine and gear case for a motor vehicle embodying my invention; Fig. 2 is a cross section on the line 2—2 of Fig. 1, showing parts of the device in plan view; Fig. 3 is a sectional detail view of the coöperating ends of the crank shaft and starting shaft; Fig. 4 is a view partly in vertical section of the fan and its adjustable bracket; Fig. 5 is a detail side view of a portion of the cover for the water jacket of the cylinder showing my improved bracket support; Fig. 6 is a plan view of what is shown in Fig. 5; and Fig. 7 is a cross section of the bracket shown in Fig. 5.

In these drawings 1 represents one of the cylinders of a hydrocarbon motor which is provided with the inlet and exhaust valve chambers 2 and 3. The crank case 4 has preferably at its front end the laterally extending hollow arms 5, the ends of which are adapted to rest upon the side bars of the motor vehicle frame as will be understood. These hollow arms form a gear case 6 in which are mounted a train of gears for driving the cam shafts, water pump and magneto for properly operating the engine. The crank shaft 7 extends from the engine into the gear case and there terminates, carrying upon its end the clutch teeth 8, with which the clutch teeth 9 of the starting shaft coöperate. The starting shaft 10, which extends forwardly beyond the radiator, is provided with the usual crank arm 11 and handle 12 for manually operating it and starting the engine.

The front end of the gear case 6 is provided with a removable cover 13 in which there is an opening 14 directly in line with the end of the crank shaft, and around this opening, but slightly separated therefrom, there is an annular flange 15 having internal screw threads. A sleeve 16 having screw threads upon its inner end is made to engage this flange 15, and this sleeve 16 has between its ends the interior rib 17 adapted to encircle and fit the reduced part of the starting shaft. Packing 18 is held in place upon the outer side of this rib and against the starting shaft by a ring 19, which screws into the outer end of the sleeve 16. The inner end of the starting shaft carrying the clutch teeth 9 is made enlarged as shown in Fig. 3, and at the inner end of this enlarged portion there is a flange 20 against which bears the end of the coil spring 21, and this spring bears at its other end upon the plate 13 within the flange 15. It will be apparent that this spring tends to force the starting shaft outwardly and out of engagement with the clutch teeth 8 on the crank shaft. By this means the shoulder formed by the flange 20 is forced into close engagement with the shoulder 22 on the rib 17, and by this means a very close joint is made when the starting shaft is in its forward position and the escape of oil through the bearing for this shaft is prevented.

The end of the crank shaft, as shown in Fig. 3, is made with an enlargement or flange 23 upon which is fitted the driving gear 24 which meshes with the cam shaft gears 25 and 26, which latter gears drive the gears 27, 28 on the pump and magneto shafts respectively. The clutch teeth 8 on the end of the crank shaft are formed on a disk 29 which is bolted to the flange 23 by bolts 30 which pass through the web 31 of the gear 24, and by this means the clutch teeth of the gear and crank shaft are firmly bound together. The gears 25, 26 are bolted to flanges 32, 33 on the respective cam shafts 34, 35 in the usual manner, and the gear 27 is suitably attached to the pump shaft 36. The gear 28 is attached to the magneto shaft 37 which is mounted in spaced bearings 38 in the crank case arm, and this shaft is oiled by the spray from the crank case which passes up through a channel 39 leading from the interior of the crank case to the central part of the shaft. On the rear end of the shaft 37 is mounted one of the members 40 of a universal coupling by which it is connected with the armature shaft 41 of the magneto 42. The member 40 has an annular flange 43 formed integral therewith, and to this flange is bolted the web of a pulley 44 which pulley extends forwardly from said flange. The pulley 44 is arranged in a vertical plane with a pulley 45 which is secured to the hub of the fan 46 so that the fan may be driven by a belt 47 passing over these pulleys. The fan and its pulley are mounted upon an adjustable bracket on the front side of the engine cylinder, and the supporting bracket for the fan is adjustably secured to a bracket carried by the cover of the water jacket for the cylinder. As will be seen by reference to Fig. 4, the hub 67 of the fan surrounds the spindle 48 and is mounted on ball bearings on the spindle which projects forwardly from the bracket 49. The spindle is rigid with the bracket and may be formed in any suitable way. As shown it is screwed into a suitable boss on the bracket. The bracket 49 is formed with the central vertical member 50 which carries the spindle 48 and an upwardly extending screw-threaded arm 51, and the two downwardly extending separated arms 52 which are bifurcated at their lower ends forming slots parallel with the arm 51. The arms 52 are adjustably secured to the end wall of the cylinder by bolts 53 fastened through the slots. The arm 51 passes through an opening 54 formed in the forward extension of a bracket 55 carried by the water jacket cover 56, and is adjustably secured to said bracket by the two nuts 57 arranged on opposite sides of the extension 55. By adjusting these nuts the bracket may be raised or lowered and may be held firmly in any position desired, thus properly adjusting the tension of the belt 47. The bracket 55 carried by the water jacket cover may be made integral with the cover 56 or may be secured thereto in any suitable way. This bracket has a suitable inclined ledge 58 upon which is mounted a support 59 for the high tension ignition wires of the motor, this support being preferably composed of fiber block with suitable openings 60 therein for the passage of the ignition wires 61. It will be understood that these wires are connected to the magneto.

Having thus described the invention, what is claimed is:

1. In a device of the class described, the combination with the crank case, of a gear case at the end thereof, a crank shaft extending through the crank case into the gear case, and a starting shaft passing through an opening in the front wall of the gear case and adapted to engage the crank shaft to turn the same.

2. In a device of the class described, the combination with the crank case, of a gear case at the end thereof, a crank shaft extending through the crank case into the gear case, a starting shaft passing through an opening in the front wall of the gear case in line with the end of said crank shaft, and means on the ends of said shafts for interengagement whereby the crank shaft may be turned by the starting shaft.

3. In a device of the class described, the combination with the crank case, of a gear case at the end thereof, a crank shaft extending through the crank case into the gear case, a starting shaft passing through an opening in the front wall of the gear case and adapted to engage the crank shaft to turn the same, a sleeve secured to the wall of said gear case at said opening and surrounding said starting shaft, packing within said sleeve, and a spring within said sleeve engaging said shaft and tending to force it outward.

4. In a device of the class described, the combination with a gear case, of a starting shaft extending through an opening in the wall thereof and longitudinally movable therein, a starting clutch on the inner end of said shaft, a flange on said wall surrounding said opening, a sleeve secured to said flange and surrounding said shaft, a packing joint between said sleeve and shaft, a spring within said sleeve, and a projecting portion of said shaft against which the spring bears to force said shaft outward.

5. In a device of the class described, the combination with the crank case, of the gear case in front thereof, a crank shaft extending through said crank case and into the gear case, an annular flange on said shaft near its end, a driving gear surrounding the end of said shaft and fitting against said flange, a clutch member fitting against the web of said gear and secured to the annular flange by bolts passing through the web of said gear, and a starting shaft extending into said gear case in line with said crank shaft.

6. In a device of the class described, a crank shaft provided with an annular flange near its end, a driving gear surrounding the said shaft and secured to said flange, and a clutch member secured to the web of said gear.

7. In a device of the class described, a crank shaft provided with an annular flange near its end, a driving gear surrounding the said shaft and fitting against said flange, a clutch member fitting the web of said gear and surrounding the end of said shaft, and bolts passing through said clutch member, web and flange securing the parts together.

8. In a device of the class described, the combination with a crank case, a clutch member carried thereby, of a gear case in front of the crank case, a starting shaft extending through the front wall of the gear case, and having a clutch member thereon to coöperate with the first mentioned clutch member, and a packing joint between said shaft and wall.

9. In a device of the class described, the combination with the crank case, of a gear case at the end thereof, a crank shaft extending through the crank case into the gear case, a starting shaft passing through the front wall of the gear case and adapted to engage the crank shaft, an auxiliary shaft driven from the crank shaft, and a fan driven from said auxiliary shaft.

10. In a device of the class described, the combination with the crank case, of a gear case at the end thereof, a crank shaft extending through the crank case into the gear case, a starting shaft passing through the front wall of the gear case and adapted to engage the crank shaft, an auxiliary shaft driven from the crank shaft, and a fan mounted above said crank shaft and driven from said auxiliary shaft.

11. In a device of the class described, the combination with the crank case, of a gear case at the end thereof, a crank shaft extending through the crank case into the gear case, a starting shaft passing through the front wall of the gear case and adapted to engage the crank shaft, an auxiliary shaft driven from the crank shaft, a fan mounted above said crank shaft, and connected pulleys on said fan and auxiliary shaft.

12. In a device of the class described, the combination with the crank case, of a gear case at the end thereof, a crank shaft extending through the crank case into the gear case, a starting shaft passing through the front wall of the gear case and adapted to engage the crank shaft, a magneto shaft driven from the crank shaft, and a fan driven from the magneto shaft.

In testimony whereof I affix my signature in presence of two witnesses.

RUSSELL HUFF.

Witnesses:
CLARA I. DALE,
HOWARD HARKNESS.